United States Patent
Choi et al.

(10) Patent No.: US 6,851,951 B2
(45) Date of Patent: Feb. 8, 2005

(54) HAND ASSEMBLY FOR A CRASH TEST DUMMY

(75) Inventors: Seong-Chull Choi, Seoul (KR); Young-Il Youm, Pohang (KR)

(73) Assignee: Hundai Motor Company, Seoul (KR)

( * ) Notice: Subject to any disclaimer, the term of this patent is extended or adjusted under 35 U.S.C. 154(b) by 0 days.

(21) Appl. No.: 10/334,942

(22) Filed: Dec. 31, 2002

(65) Prior Publication Data

US 2003/0224342 A1 Dec. 4, 2003

(30) Foreign Application Priority Data

May 31, 2002 (KR) .................................. 10-2002-0030658

(51) Int. Cl.[7] .......................... G09B 23/32; G01M 19/00
(52) U.S. Cl. ..................... 434/262; 434/267; 623/64; 73/866.4
(58) Field of Search .................... 223/66; 446/376, 446/390; 623/64, 62, 65, 57, 63, 33; 434/267, 274, 262; 73/866.4; 600/553; 294/106

(56) References Cited

U.S. PATENT DOCUMENTS

| | | | | |
|---|---|---|---|---|
| 908,881 A | * | 1/1909 | Nelson ........................ 623/59 |
| 1,272,006 A | * | 7/1918 | Caron ......................... 623/60 |
| 1,332,485 A | * | 3/1920 | Caron ......................... 623/62 |
| 1,390,802 A | * | 9/1921 | McKay ........................ 623/65 |
| 1,774,715 A | * | 9/1930 | Livingston ................... 623/61 |
| 2,415,145 A | * | 2/1947 | Mollenhour ................. 623/61 |
| 2,733,545 A | * | 2/1956 | Guadagna .................... 446/330 |
| 3,538,515 A | * | 11/1970 | Brown ........................ 623/65 |
| 3,604,017 A | * | 9/1971 | Brown et al. ................. 623/64 |
| 3,693,288 A | * | 9/1972 | Lewis et al. ................. 446/330 |
| 5,018,977 A | * | 5/1991 | Wiley et al. ................. 434/274 |
| 5,116,386 A | * | 5/1992 | Scribner ...................... 623/64 |
| 2003/0195638 A1 | * | 10/2003 | Kajitani et al. |

FOREIGN PATENT DOCUMENTS

WO    WO 98/47122    10/1998

* cited by examiner

Primary Examiner—Derris H. Banks
Assistant Examiner—Dmitry Suhol
(74) Attorney, Agent, or Firm—Morgan Lewis & Bockius LLP

(57) ABSTRACT

A hand assembly for a dummy is provided which comprises a housing, a finger assembly operatively mounted to the housing, and a biasing member configured to bias the finger assembly such that the finger assembly generates a grasping force. The biasing member being mounted to the housing, and a connecting member rotatably mounted to the housing where the connecting member is connected to a forearm of the dummy.

12 Claims, 2 Drawing Sheets

HAND ASSEMBLY FOR A CRASH TEST DUMMY

FIELD OF THE INVENTION

The present invention relates to a crash test dummy, and more particularly, to a hand assembly for the crash test dummy that can generate a grasping force like a human hand.

BACKGROUND OF THE INVENTION

Generally, dynamic simulation modeling of a driver's body for vehicle crash testing facilitates the design of safer vehicles. Driver models for crash testing is classified into a crash test dummy model and a computer simulation model. Furthermore, the computer simulation model includes a rigid-body model and a finite element model. One drawback of such models is that they simplify the operation of human muscles as a passive component, not an active component in crash testing. However, it has been reported that the active behavior of muscles of a human body has substantial effects on the dynamic response of the human body during a vehicle crash.

Further, in order to improve biofidelity, a model of the human body should be as human-like as possible. Therefore, the function of muscles, as an actuator that voluntarily contracts to generate a force and a moment, should be considered. Particularly the involvement of the muscles should be considered in the crash situation where the occupants have a perception of the crash or a sub-maximal crash situation.

The conventional design of a hand assembly on a steering wheel of the crash test dummy does not have a great similarity with that of a human. Such a conventional dummy cannot reflect the dynamics of a human body during a crash, therefore the data acquired is not an accurate representation of the injury assessment.

SUMMARY OF THE INVENTION

In preferred embodiments of the present invention, a hand assembly for a dummy comprises a housing, a finger assembly, a biasing member, and a connecting member. The finger assembly is operatively mounted to the housing. The biasing member biases the finger assembly such that the finger assembly generates a grasping force, and the biasing member is mounted to the housing. The connecting member is rotatably mounted to the housing, and the connecting member is connected to a forearm of the dummy.

In a preferable embodiment, the housing includes a pair of frames facing each other. It is also preferable that the finger assembly comprises a first finger, a second finger, and a link member. The first finger is pivotally mounted to the frames. One end of the biasing member is connected to the first finger, and the other end of the biasing member is connected to a pin connecting the frames. The second finger is also pivotally mounted to the frames. The link member connects the first finger and the second finger, and the link member is pivotally connected to the first finger and the second finger such that a rotating force can be transferred between the first finger and the second finger.

It is further preferable that facing inner surfaces of the first finger and the second finger form concave shapes. Also preferred is that the hand assembly for the dummy further comprises a rotation-restriction member for restricting angles of rotation of the first finger and the second finger.

It is still further preferable that the rotation-restriction member includes a first pin member and a second pin member that are respectively mounted between the frames. Rotation of the first finger and the second finger are blocked respectively by the first pin member and the second pin member after the first finger and the second finger rotate by predetermined angles. Preferably, the connecting member is rotatably mounted to a connecting pin that connects the facing frames.

It is preferable that the connecting member is allowed to rotate at a predetermined angle. Preferably, the connecting member is a revolute joint that exhibits a measured force of a wrist of a human being by regulating an amount of friction force. It is also preferable that there are two biasing members and link members.

BRIEF DESCRIPTION OF THE DRAWINGS

The accompanying drawings, which are incorporated in and constitute a part of the specification, illustrate an embodiment of the invention, and together with the description, serve to explain the principles of the invention, where.

DETAILED DESCRIPTION OF THE INVENTION

Figure 1:
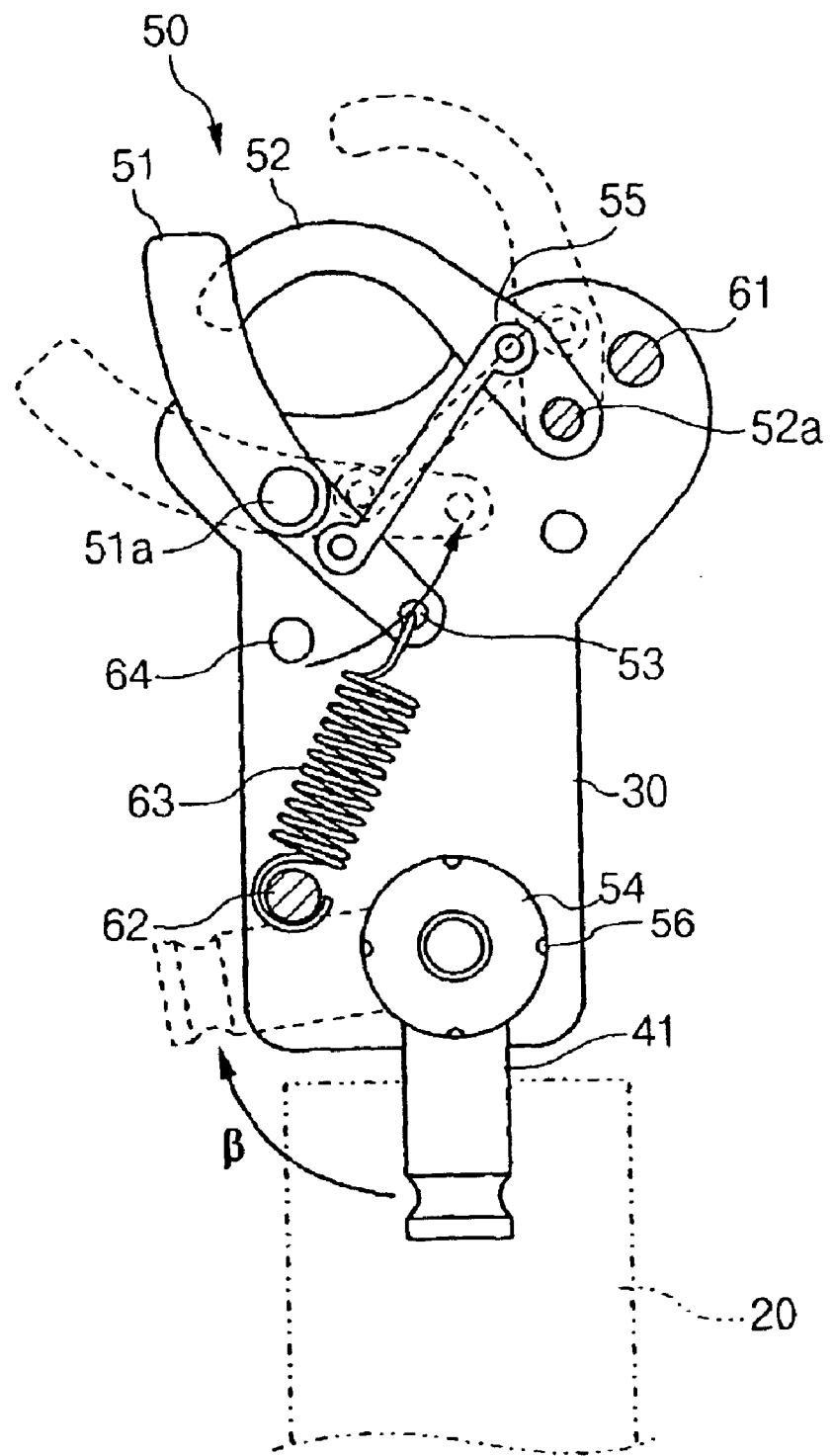
FIG. 1 is a schematic side view of an embodiment of a hand assembly of a crash test dummy according to an embodiment of the present invention.
Figure 2:
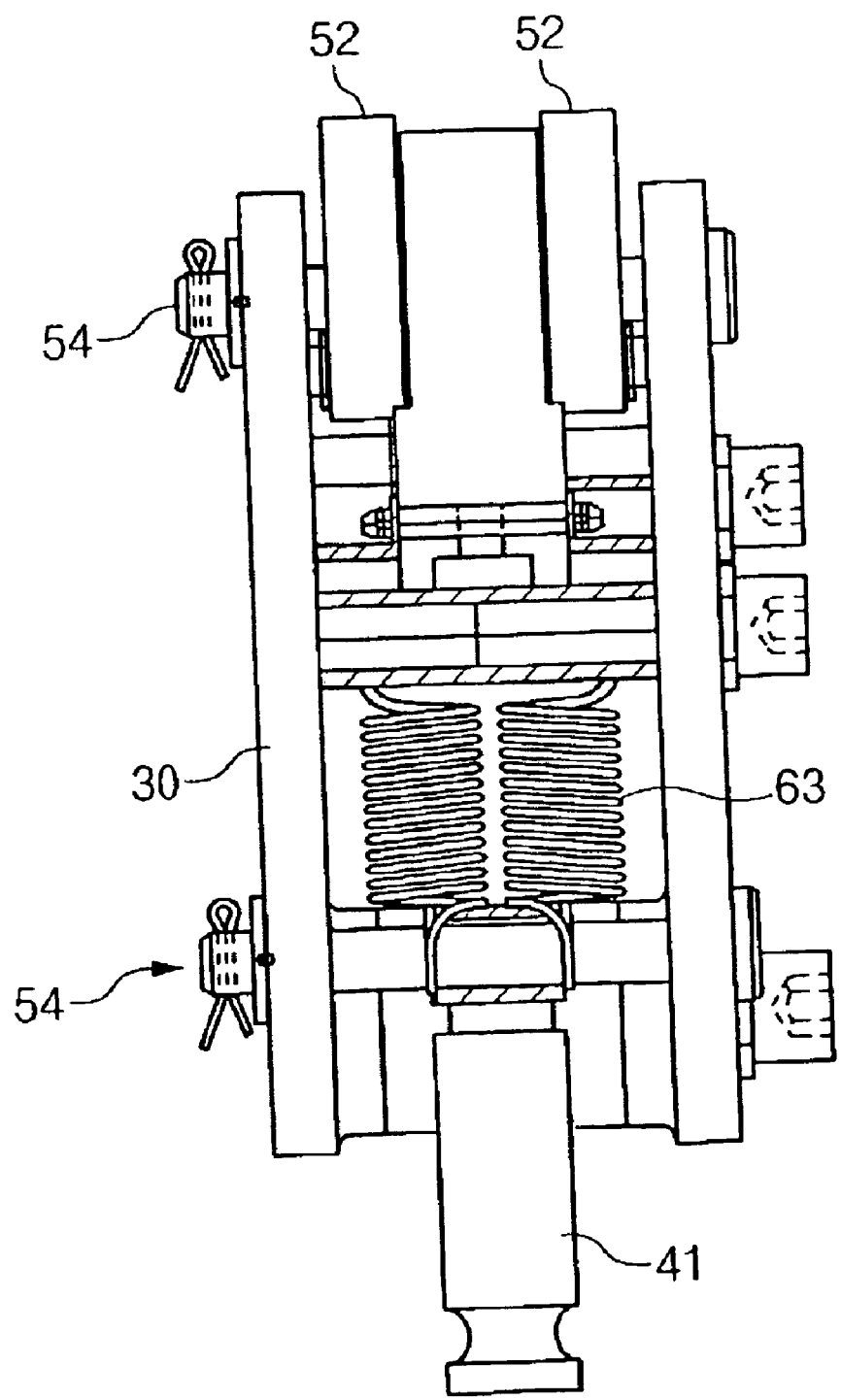
FIG. 2 is a schematic rear view of an embodiment of a hand assembly of a crash test dummy according to an embodiment of the present invention.

As shown in FIGS. 1 and 2, a hand assembly of a crash test dummy according to an embodiment of the present invention includes a pair of frames 30 facing each other. A finger assembly 50 is operatively mounted between the frames 30 such that the finger assembly 50 can grasp a steering wheel of a vehicle. A biasing member 63 is mounted between the frames 30, and it is connected to the finger assembly 50 such that the finger assembly 50 can generate a grasping force. A connecting member 41 is rotatably mounted between the frames 30 through a connecting pin 54, and the connecting member 41 is connected to a forearm 20 of the crash test dummy. The frames 30 make up a housing to which the finger assembly 50, the biasing member 63, and the connecting member 41 are mounted. In an alternate embodiment the housing is configured in the shape of a hollow cylinder.

The finger assembly 50 includes a first finger 51 and a second finger 52, and a link member 55 for connecting the first and second fingers 51 and 52. The first finger 51 and the second finger 52 are rotatably mounted between the frames 30 with connecting pins 51a and 52a. Therefore, the first finger can pivotally rotate around the connecting pin 51a, and the second finger can pivotally rotate around the connecting pin 52a. Furthermore, the first finger 51 and the second finger 52 are preferably concave shape to effectively grasp a steering wheel of a vehicle.

One end portion of the biasing member 63 is connected to the first finger 51, and the other end portion is rotatably connected to a pin member 62 that is mounted to the facing frames 30. In a preferred embodiment the biasing member 63 is a coil spring.

The link member 55 is pivotally connected to the end of the first finger 51 and the end of the second finger 52. The second finger 52 rotates when the first finger 51 rotates by the force of the biasing member 63.

Rotation restriction members 61 and 64 are provided in order to restrict the maximum rotating displacement of the first and second fingers 51 and 52. In a preferred embodiment the rotation restriction members 61 and 64 can be rods connecting the facing frames 30.

Referring to FIG. 2, after the first finger 51 rotates in a clockwise direction (with respect to the drawing) by a predetermined angle around the connecting pin 51a, the rotation restriction member 64 blocks any further rotation of the first finger 51. Similarly, after the second finger 52 rotates in a counter clockwise direction (with respect to the drawing) by a predetermined angle around the connecting pin 52a, the rotation restriction member 61 blocks further rotation of the second finger 52. Consequently, the maximum displacements of the first and second fingers 51 and 52 are restricted.

The connecting member 41 is rotatably mounted to the facing frames 30 through a connecting pin 54 in such a way that the connecting member 41 rotates to a predetermined angle. The rotation of the connecting member 41 is blocked by the pin 62. The connecting member 41 is connected to a forearm 20 of the crash test dummy.

Preferably, the connecting member 41 can be realized by a revolute joint designed such that the power of a human's wrist can be realized by an amount of friction force between the connecting member 41 and the connecting pin 54. In a preferred embodiment such friction force may be regulated by a height of serrations 56 on the connecting pin 54.

It is preferable that the respective number of second fingers 52, biasing members 63, and link members 55 is more than 2. In a preferred embodiment the rotation angles of the first and second fingers 51 and 52 are not restricted at a specific angle.

The operation of the hand assembly for the dummy according to an embodiment of the present invention will be explained hereinafter.

According to FIGS. 1 and 2, the connecting member 41 is coupled to the forearm 20, and directions of forces acting on the first and second fingers 51 and 52 are designated by the arrow. The spring force of the biasing member 63 acts on the first and second fingers 51 and 52 so that the first and second fingers 51 and 52 are maintained in a closed fashion. If an external force acts on the first and second fingers 51 and 52 is greater than the spring force acting on the first and second fingers 51 and 52, the first and second fingers 51 and 52 will be opened so that the hand assembly can be released from the steering wheel.

Pivotal operations of the link member 55 enable the first and second fingers 51 and 52 to rotate together. When a spring force of the biasing member 63 acts on the end of the first finger 51, the first finger 51 is urged to rotate in the clockwise direction (with respect to the Figure), and the link member 55 moves together with the first finger 51. Simultaneously, the link member 55 pulls the second finger 52 to rotate in the counter clockwise direction (with respect to the Figure) so that the first and second fingers 51 and 52 are located in positions as shown by solid line drawings of the fingers 51 and 52 in FIG. 1.

If an external force that can overcome the spring force of the biasing member 63 acts on the first finger 51, the first finger 51 is urged to rotate. Simultaneously, the link member 55 pushes the second finger 52 so that the second finger 52 rotates in the clockwise direction (with respect to the Figure) so that the first and second fingers 51 and 52 are located in positions as shown by dotted line drawings of the fingers 51 and 52 in FIG. 1.

The connecting member 41 can be realized by a revolute joint, and the revolute joint mimics the role of a human wrist. In a preferred embodiment the revolute joint is altered to exhibit a measured force of a wrist of a particular human by regulating an amount of friction force between the connecting member 41 and the connecting pin 54. As an example, such friction force may be regulated by a height of serrations on the connecting pin 54, wherein the height of the serrations are increased to exhibit a higher wrist strength.

Although preferred embodiments of the present invention have been described in detail hereinabove, it should be clearly understood that many variations and/or modifications of the basic inventive concepts herein taught which may appear to those skilled in the present art will still fall within the sprit and scope of the present invention. The scope of the present invention is intended to by defined in the appended claims an not by the above specification.

What is claimed is:

1. A hand assembly for a dummy, comprising:
   a housing including a pair of frames facing each other;
   a finger assembly operatively mounted to said housing;
   at least one biasing member configured to bias to the finger assembly such that the finger assembly generates a grasping force, the biasing member being mounted to the housing; and
   a connecting member rotatably mounted to the housing, the connecting member being connected to a forearm of the dummy, wherein the finger assembly comprises:
   a first finger pivotally mounted to the frames, one end of the biasing member being connected to the first finger, and the other end of the biasing member being connected to a pin connecting the frames;
   at least one second finger pivotally mounted to the frames; and
   at least one link member connecting the first finger and the second finger, the link member being pivotally connected to the first finger and the second finger such that a rotating force can be transferred between the first finger and the second finger.

2. The hand assembly of claim 1, wherein facing inner surfaces of the first finger and the second finger have a concave shape.

3. The hand assembly of claim 1, further comprising a rotation restriction member for restricting angles of rotation of the first finger and the second finger.

4. The hand assembly of claim 3 wherein the rotation restriction member includes a first pin member and a second pin member that are respectively mounted between the frames, wherein rotations of the first finger and the second finger are blocked respectively by the first pin member and the second pin member after the first finger and the second finger rotate by predetermined angles.

5. The hand assembly of claim 1, wherein the connecting member is rotatably mounted to a connecting pin that connects the facing frames.

6. The hand assembly of claim 1, wherein the connecting member is configured to rotate at a predetermined angle.

7. The hand assembly of claim 1, wherein the connecting member is a joint that produces frictional force.

8. The hand assembly of claim 1, further comprising:
   two second fingers,
   a second biasing member, and
   two link members.

9. A hand assembly for a dummy, comprising:
   a housing moveably coupled with an arm assembly of a dummy, wherein the housing includes a pair of frames facing each other;

at least one pair of opposing hinged members rotatably coupled with said housing;

a closing force member configured to apply a closing force to said opposing hinged members such that said opposing hinged members move toward each other; and a movement restricting member configured to restrict movement of said housing with respect to a arm portion of the dummy, wherein the pair of opposing hinged members comprises:

a first finger rotatably mounted to the housing, one end of the closing force member being connected to the first finger, and the other end of the closing force member being connected to a pin connecting the frames:

a second finger pivotally mounted to the frames; and a link member connecting the first finger and the second finger, the link member being rotatably connected to the first finger and the second finger such that a rotating force can be transferred between the first finger and the second finger.

10. The assembly of claim 9 wherein said opposing hinged members are toward each other such that when rotated toward each other a substantially closed substantially circular shape is formed.

11. The assembly of claim 9 wherein said movement restricting member comprises a joint producing a frictional force for restricting movement of the joint.

12. The assembly of claim 11 wherein said frictional force is generated by forming serrations of the joint surface of said movement restricting member.

* * * * *